US008515783B1

(12) United States Patent
Weeks

(10) Patent No.: US 8,515,783 B1
(45) Date of Patent: Aug. 20, 2013

(54) RISK ASSESSMENT METHOD

(75) Inventor: Betty L. Weeks, Leawood, KS (US)

(73) Assignee: Swiss Reinsurance Company Ltd., Zürich (CH)

( * ) Notice: Subject to any disclaimer, the term of this patent is extended or adjusted under 35 U.S.C. 154(b) by 949 days.

(21) Appl. No.: 09/707,200

(22) Filed: Nov. 6, 2000

(51) Int. Cl.
*G06Q 40/00* (2012.01)

(52) U.S. Cl.
USPC .......................................................... 705/4

(58) Field of Classification Search
USPC .......................................................... 705/4
See application file for complete search history.

(56) References Cited

U.S. PATENT DOCUMENTS

| | | | | |
|---|---|---|---|---|
| 4,722,055 | A * | 1/1988 | Roberts | 705/36 |
| 4,831,526 | A * | 5/1989 | Luchs et al. | 705/4 |
| 4,975,840 | A * | 12/1990 | DeTore et al. | 705/4 |
| 5,191,522 | A * | 3/1993 | Bosco et al. | 705/4 |
| 5,479,344 | A | 12/1995 | Kerziah, Jr. | 705/4 |
| 5,523,942 | A | 6/1996 | Tyler et al. | 705/4 |
| 5,809,478 | A * | 9/1998 | Greco et al. | 705/4 |
| 5,855,005 | A | 12/1998 | Schuler et al. | 705/4 |
| 5,873,066 | A | 2/1999 | Underwood et al. | 705/4 |
| 5,918,219 | A * | 6/1999 | Isherwood | 705/37 |
| 5,970,479 | A | 10/1999 | Shepherd | 705/37 |
| 6,088,678 | A * | 7/2000 | Shannon | 705/8 |
| 6,092,050 | A * | 7/2000 | Lungren et al. | 705/10 |
| 6,219,654 | B1 * | 4/2001 | Ruffin | 705/400 |
| 6,330,547 | B1 * | 12/2001 | Martin | 705/38 |
| 6,374,358 | B1 * | 4/2002 | Townsend | 713/201 |
| 6,397,202 | B1 * | 5/2002 | Higgins et al. | 706/47 |
| 6,463,457 | B1 * | 10/2002 | Armentrout et al. | 709/201 |
| 6,470,321 | B1 * | 10/2002 | Cumming et al. | 705/4 |
| 6,647,374 | B2 * | 11/2003 | Kansal | 705/37 |
| 6,684,189 | B1 * | 1/2004 | Ryan et al. | 705/4 |
| 6,871,181 | B2 * | 3/2005 | Kansal | 705/4 |
| 6,912,502 | B1 * | 6/2005 | Buddle et al. | 705/1 |
| 7,386,463 | B2 * | 6/2008 | McCabe | 705/4 |
| 2002/0095317 | A1 * | 7/2002 | McCabe | 705/4 |
| 2002/0198744 | A1 * | 12/2002 | Sagalow et al. | 705/4 |

FOREIGN PATENT DOCUMENTS

| | | |
|---|---|---|
| JP | 9114801 | 5/1997 |
| WO | WO00/17799 | 3/2000 |

OTHER PUBLICATIONS

Errors and Omissions Insurance, InsurePro, Gaston and Associates, Inc., accessed Jun. 2, 2004.*
Administrator has coverage for Internet service providers, Rough Notes, Indianapolis, vol. 142, Iss. 3, Mar. 1999, p. 11.*
Zinkewicz, Phil, Covering the risks of cyberspace, Rough Notes, Dec. 1999, vol. 142, Issue 12, Dec. 1999, p. 80.*

(Continued)

*Primary Examiner* — David Rines

(74) *Attorney, Agent, or Firm* — Oblon, Spivak, McClelland, Maier & Neustadt, L.L.P.

(57) ABSTRACT

A risk assessment method for insurance coverage of an enterprise includes identifying component risk activities of the enterprise, identifying the risk exposure factors which may be applicable to such activities, numerically scoring each activity against each risk exposure factor on the frequency and severity of potential claims on the exposure factor for the activity in a risk matrix, summing all the scores for each activity to obtain a corresponding total risk rating, and analyzing each total risk rating against hierarchies of approval authority to bind coverage on the activity and the potential premium rate for the activity. The method includes identifying a highest total risk rating an applicant as a customer rating which is used as an overall measure of potential risk exposure for the applicant. The method includes the capability of automatically declining, approving, or renewing coverage based on the customer rating.

22 Claims, 4 Drawing Sheets

| RISK ACTIVITIES | RISK EXPOSURE FACTORS | | | E & O COVERAGE CLASS | | | | | |
|---|---|---|---|---|---|---|---|---|---|
| | PRODUCT/SERVICE FAILURE | BUSINESS INTERRUPTION | SOURCING VIRUS | LOSS OF SALES | BUSINESS REPUTATION | SYSTEM RESTORATION | LOSS OF CUSTOMER DATA | DEFENSE/ INVESTIGATION | E & O SUBTOTAL |
| TRAINING/HELP DESK | 1 | 1 | 0 | 1 | 1 | 1 | 1 | 1 | 7 |
| SYSTEM INSTALLATION/MAINTENANCE | 1 | 1 | 2 | 1 | 1 | 1 | 1 | 1 | 9 |
| SYSTEM INTEGRATION | 3 | 3 | 2 | 3 | 3 | 3 | 1 | 1 | 19 |
| WEB PAGE DEVELOPMENT & MAINTENANCE | 4 | 2 | 1 | 3 | 5 | 2 | 1 | 1 | 19 |
| WEB PAGE HOSTING | 4 | 4 | 2 | 4 | 3 | 1 | 3 | 2 | 23 |
| SOFTWARE APPLICATIONS DEVELOPMENT | 3 | 3 | 2 | 3 | 3 | 3 | 1 | 2 | 20 |
| COMPUTER NETWORK CONSULTANT | 2 | 1 | 0 | 1 | 1 | 1 | 1 | 2 | 9 |

(56) References Cited

OTHER PUBLICATIONS

The best tools to manage subs' risk and performance, Contractor's Business Management Report, Jan. 2000, p. 1.*
PR Newswire, Insuretrust.com agrees with legion indemnity company to offer industry's most innovative e-business insurance policies, PR Newswire, Dec. 15, 1999, p. 1.*
U.S. Appl. No. 60/243,547.*
Dr. Ronald L. Meier, Integrating Enterprise-Wide Risk Management Concepts into Industrial Technology Curricula, Journal of Industrial Technology, vol. 16, No. 4, Aug. 2000-Oct. 2000, pp. 1-15.*
Mark Keil et al., A Framework for Identifying Software Project Risks, Communications of the ACM, vol. 41, No. 11, Nov. 1998, pp. 76-83.*
Ed Praytor, The Trick to Assessing Year 2000 Exposures, Property & Casualty/ Risk & Benefits Management, National Underwriter, Jun. 1997, pp. 3, 9, 22-23.*
Mercedes M. Perez, Beyond the E&O Crisis, Best's Review, ABI/INFORM Global, Sep. 1998, pp. 48-54, 132.*
Predictive: Predictive Limited Unveils Risk Analysis Methodology for Network-based, Critical Applications, M2 Presswire, Mar. 29, 1999, p. 1.*
Arabella Hallawell, Tomorrow's Technology: Insurance, Forbes, vol. 1, Iss. 1, Sep. 1998, p. 12.*
Robert M. Bieber, The Making of a Risk Manager—Part Two, Risk Management, Oct. 1987, pp. 48-56.*
AIG Member Companies to Offer Liability Insurance Programs to Information Technology Association of America—ITAA—Members, Business Editors, Business Wire, New York: May 2, 2000, p. 1.*
Using Microsoft Excel 97, Bruce Hallberg, 1997, pp. 91-92.*
Abstract of JP911480 in English from esp@cenet database.
Abstract of JP911480 in English from Dialog/Derwent database.

* cited by examiner

FIG. 3

| RISK EXPOSURE FACTORS / RISK ACTIVITIES | PRODUCT/SERVICE FAILURE | BUSINESS INTERRUPTION | SOURCING VIRUS | LOSS OF SALES | BUSINESS REPUTATION | SYSTEM RESTORATION | LOSS OF CUSTOMER DATA | DEFENSE / INVESTIGATION | E & O SUBTOTAL |
|---|---|---|---|---|---|---|---|---|---|
| TRAINING/HELP DESK | 1 | 1 | 0 | 1 | 1 | 1 | 1 | 1 | 7 |
| SYSTEM INSTALLATION/MAINTENANCE | 1 | 1 | 2 | 1 | 1 | 1 | 1 | 1 | 9 |
| SYSTEM INTEGRATION | 3 | 3 | 2 | 3 | 3 | 3 | 1 | 1 | 19 |
| WEB PAGE DEVELOPMENT & MAINTENANCE | 4 | 2 | 1 | 3 | 5 | 2 | 1 | 1 | 19 |
| WEB PAGE HOSTING | 4 | 4 | 2 | 4 | 3 | 1 | 3 | 2 | 23 |
| SOFTWARE APPLICATIONS DEVELOPMENT | 3 | 3 | 2 | 3 | 3 | 3 | 1 | 2 | 20 |
| COMPUTER NETWORK CONSULTANT | 2 | 1 | 0 | 1 | 1 | 1 | 1 | 2 | 9 |

FIG. 4

| RISK ACTIVITIES | RISK EXPOSURE FACTORS / BROAD TORT COVERAGE CLASS | | | | | | | TOTAL RISK RATING | SEVERITY / FREQUENCY |
|---|---|---|---|---|---|---|---|---|---|
| | PRIVACY DATA USE AND/OR SALE | TRADEMARK INFRINGEMENT | DEFAMATION | INVASION OF PRIVACY | RIGHTS OF PUBLICITY | DEFENSE COSTS | TORT SUBTOTAL | | |
| TRAINING/HELP DESK | 1 | 1 | 0 | 0 | 0 | 1 | 3 | 11 | LS/LF |
| SYSTEM INSTALLATION/MAINTENANCE | 1 | 1 | 0 | 0 | 0 | 1 | 3 | 13 | LS/LF |
| SYSTEM INTEGRATION | 0 | 1 | 0 | 0 | 0 | 1 | 2 | 28 | LS/LF |
| WEB PAGE DEVELOPMENT & MAINTENANCE | 1 | 4 | 3 | 3 | 4 | 5 | 20 | 50 | HS/MF |
| WEB PAGE HOSTING | 1 | 1 | 1 | 1 | 1 | 1 | 6 | 30 | MS/LF |
| SOFTWARE APPLICATIONS DEVELOPMENT | 1 | 2 | 1 | 3 | 3 | 4 | 14 | 46 | M-HS/LF |
| COMPUTER NETWORK CONSULTANT | 0 | 1 | 1 | 0 | 0 | 1 | 3 | 12 | LS/LF |

RISK ASSESSMENT METHOD

BACKGROUND OF THE INVENTION

Generally, the purpose of insurance is to distribute the costs of the potential risks of a number of individual persons or companies over a large "pool" of such persons or companies. The insurer indemnifies each insured against a limited level of loss from a specified risk or risks. In return, each insured pays a "premium", the premiums being pooled and invested to provide funds to pay for settlements of claims, when and if necessary. The insurer uses historical data, financial information, statistics, and information from other sources to gauge the amount of premiums paid by each insured against the aggregate losses of the pool of insureds. There are also regulatory aspects to setting premium rates. If an insurer's income from premiums exceeds payouts for claims, the insurer makes a profit. However, in a competitive insurance market, an insurer must limit premiums charged to the minimums required to cover any claims, overhead, and a modest profit. Thus, it is advantageous to an insurer to assess, as accurately as possible, the frequency and severity of any risks which it insures against and to charge premiums closely gauged to the probable payout which may be required.

Historically, insurers have tended to approach the setting of premiums from a consideration of overall claim payouts distributed, along with administrative overhead, over the total number of insureds. Risks are grouped according to characteristics in common, and statistics regarding demographics, risk exposure modifying behavior and activities, claim settlements, court rulings, actual claim payouts, and other factors are recorded over time and analyzed. Factors which correlate with increased or decreased claims payouts are identified and applied accordingly to the premium rate structure. In general, the insurance industry is fairly successful in most coverage areas, in that insurance underwriting is profitable to many insurance companies and regarded as beneficial to many insureds.

An area in which traditional approaches to risk assessment often fail is in coverage of new industries or in developing new insurance "products" where there is little or no history to analyze. For example, there is currently a proliferation of businesses and individuals engaged in developing, and consulting in relation to, all manner of computer applications, including websites and web-based business methods. In addition to the types of risks which face all businesses, many of these computer application developers face additional risks which have been traditionally associated with medical and legal practitioners, such as malpractice or "errors and omissions" risks. The rapidly expanding and changing nature of the computer consulting industry and the types of services performed and the changing nature of risks encountered, make it difficult to rely primarily on historical data to assess the risks encountered in the industry, and to make informed underwriting decisions. What is needed is a method for assessing risks associated with various activities, including the operation of businesses, which can more accurately characterize such risks, even without large amounts of historical data, to enable a determination of which risks to cover and those to decline, as well as the costs for such coverage.

SUMMARY OF THE INVENTION

The present invention is directed to a risk assessment method which identifies coverage risk activities which are weighted by associated coverage exposure factors to determine whether or not insurance coverage is advisable and to establish ranges of premiums and authority required to underwrite coverage of such exposures. The risk assessment method of the present invention is particularly applicable to assessing risks of business enterprises or activities for potential coverage. However, the methods of the present invention can also be applied to other areas, such as property and casualty insurance including, but not limited to, automobile, professional liability and, to some extent, to healthcare, life insurance, and personal lines. The present invention correlates activities or functions of a business enterprise with types of claims that might arise from such activities or functions.

In general, the risk assessment method of the present invention comprises breaking down an enterprise into component activities each of which involves some type of risk which may be insurable, analyzing each component activity for the classes of risk involved and numerically scoring the severity and frequency of occurrence of the particular risks that are associated with such a component activity, summing the scores for each component activity to obtain a total risk rating, and applying the total risk rating against a scale of approval authority and premium structure. The approval authority scale ranges from a high risk threshold, beyond which the insurer may decline to offer coverage, to a low risk automatic approval threshold, below which approval of coverage may be made automatic. In between the high risk and the low risk automatic approval thresholds, the total risk ratings are scaled to a hierarchy of approval authority within an insurance company to bind the company to coverage of the activities. Additionally, premium rates may be gauged, to some extent, to the scale of total risk ratings. In general, premium rates tend to be regulated by state insurance commissions. However, the risk assessment methods of the present invention can be used, at least in part, to make a case for establishing or changing premium rates to such a commission.

The present invention is particularly adapted for automated quoting and automatic approval under appropriate circumstances, for example, by way of a web-based risk assessment application. Such a risk assessment application queries a prospective customer as to the overall nature of their business and the presence of selected activities within the practice of their business. The application stores the customer's answers and compares each total risk rating associated with an activity to a high risk threshold and a low risk threshold. The total risk ratings are then compared to the approval hierarchy and the rate structure for the level of coverage desired. If any total risk rating exceeds the pre-established high risk threshold, coverage of the enterprise may be declined. Alternatively, the total risk ratings of the included activities may be summed, and the risk sum compared with pre-established thresholds. The total risk ratings may be used to cause automatic approval of the coverage of the enterprise and to cause generation of an insurance coverage contract or may require further evaluation by an underwriter with appropriate authority. The identity of the customer, history of past claims, credit rating, and other factors may affect whether coverage is offered, whether there are exclusions in the coverage, and the premium required for the coverage sought by the customer.

Whether a given insurer approves a contract for an enterprise may also depend on the insurer's underwriting "capacity" for a given activity or risk. An insurer's overall capacity to underwrite coverage is limited by a regulated relationship to the insurer's "reserves" of funds for possible payout of claims. Insurers commonly divide their total capacity into component capacities for given risks or activities. Once an insurer has reached its limit of underwriting capacity for a given activity, it may decline to cover an enterprise engaged in such an activity or, alternatively, exclude the particular activity from coverage.

Objects and Advantages of the Invention

The principal objects of the present invention are: to provide an improved method for underwriting insurance risks; to provide, particularly, an improved method for risk assessment; to provide such a method which divides enterprises involving risk into component activities including some activities with well known risk factors and possibly including others about which less is known or about which there is little existing history or risk data; to provide such a method which applies existing risk data where possible to maximize the use of existing data and history and to minimize the need to underwrite activities with little or no existing data or history; to provide such a method including identifying component activities of a business entity involving risk, numerically scoring the risk exposure of each component activity within a series of risk exposure categories, summing the scores for each component activity, establishing a maximum risk threshold beyond which coverage will be declined, establishing a low risk exposure threshold below which coverage can be made automatic, and scaling the risk exposure for each component activity to a hierarchy of approval authority; to provide such a method which is well suited to automation and the use of computers and web-based applications for collection of customer information and processing of such information for risk assessment purposes; to provide such a method which creates a risk assessment matrix of risk activities intersecting with risk exposure factors at numeric risk exposure scores of the particular risk exposure factors for a given risk activity derived as a measure of frequency of occurrence and likely severity of the particular risk exposure factor; to provide such a method in which the risk exposure scores for a given risk activity are summed and applied against a hierarchy of approval authority ranging from an excessive level at which coverage may be declined to a minimal level for which automatic approval might be appropriate, with varying degrees of approval authority therebetween; to provide such a method which is particularly applicable to assessing risks associated with insuring business activities but which can also be adapted for assessing risks associated with other insurable activities; and to provide such a method which is economical to practice, which is accurate and efficient in practice, and which is particularly well adapted for its intended purpose.

Other objects and advantages of this invention will become apparent from the following description taken in relation to the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 3 is a risk assessment matrix diagram illustrating an exemplary collection of risk coverage class data which forms part of the risk assessment method of the present invention.

FIG. 4 is a risk assessment matrix diagram illustrating a collection of risk data from an additional exemplary risk coverage class according to the present invention.

DETAILED DESCRIPTION OF THE INVENTION

Figure 1:
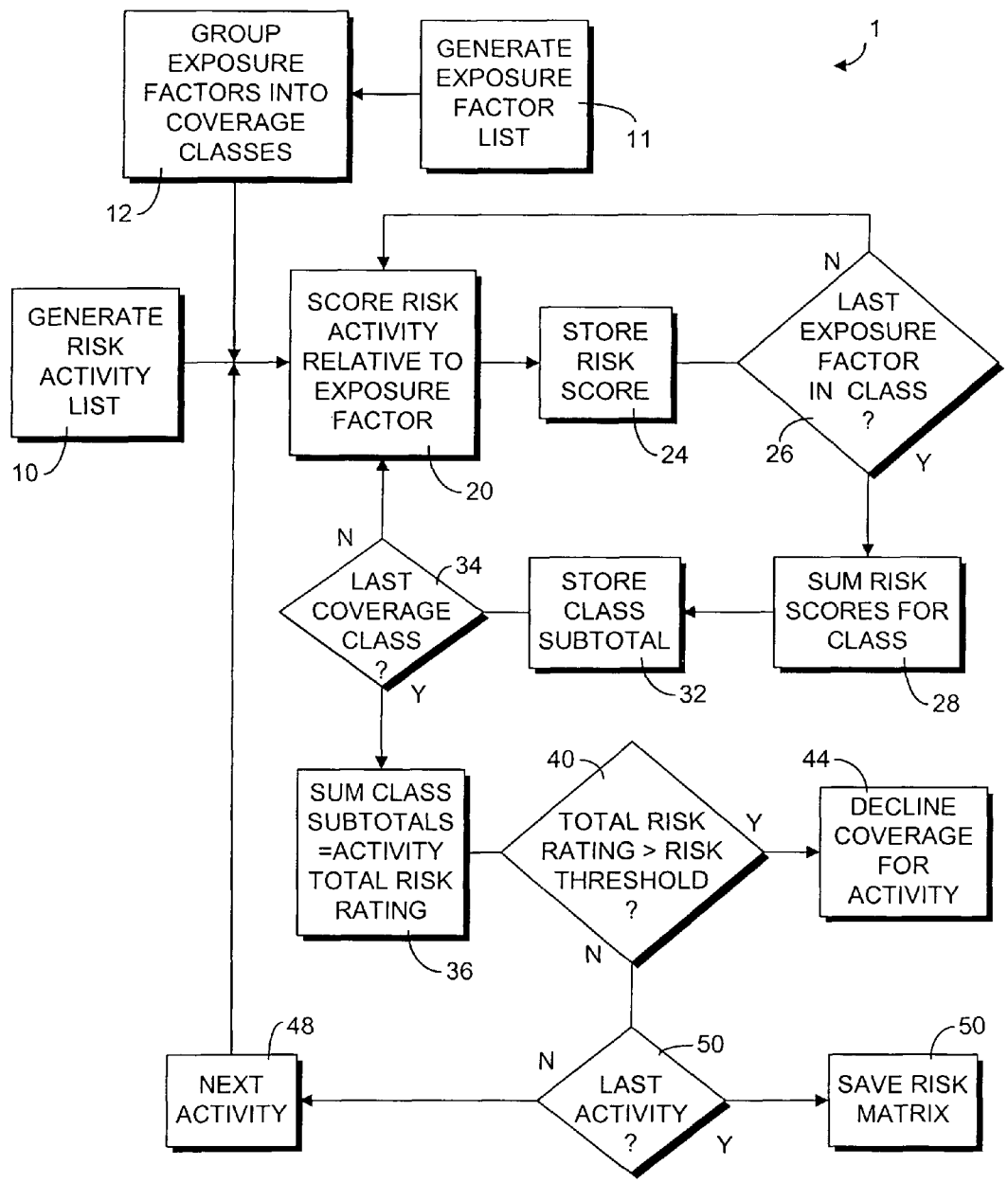
FIG. 1 is a flow diagram illustrating the principal steps in generating a risk assessment matrix forming a component of the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates a risk assessment method or process which embodies the present invention. The method 1 is generally used to divide an activity, such as a business enterprise or industry, into multiple aspects or component activities which may be undertaken by a participant in the industry and which involve some kind of risk; to assess each activity in relation to a multitude of risk factors to which the activity might be subjected over time by assigning a numeric score to the activity for the given risk factor based on likely frequency of occurrence and likely severity; to sum the scores for the activity; and to apply the score sum or total risk rating to a hierarchy of approval authority to determine if the activity will be underwritten, the level of authority required to approve coverage, and the cost or premium for coverage. A preferred tool for practicing the risk assessment method 1 of the present invention is a risk assessment matrix 2 (FIGS. 3 and 4) which graphically arrays risk activities 3 with respect to risk exposure factors 4.

FIG. 1 illustrates steps comprising the risk assessment method 1 which generates a risk assessment matrix 2 (FIGS. 3 and 4) for use in making underwriting decisions relative to a particular industry or enterprise. For exemplary purposes, the matrix 2 is shown in the drawings and described below with reference to the computer services industry. First, an industry, enterprise or major activity is analyzed to generate at 10 a list of component activities 3 which might be undertaken by a participant in the industry and which involve some sort of risk. Although the term "enterprise" is used herein, it is not intended to restrict application of the present invention only to activities involved in operating a business. The application of the method 1 to a business enterprise is intended as an exemplary embodiment. Alternatively, the risk assessment method 1 could be applied to other activities or enterprises, such as ownership of a home, private operation of an automobile, or the like.

The method 1 includes the generation at 11 (See FIG. 1) of a list of exposure factors 4 (See FIGS. 3 and 4), which may be encountered by a participant in the industry, but not all of which may be applicable to every risk activity 3. The exposure factors 4 are grouped at 12 by similar characteristics into exposure or coverage classes 14. The exposure factors 4 are actual risks which may be involved in pursuit of the activities 3.

Referring to FIGS. 3 and 4, component risk matrices 16 and 18 are shown respectively for exemplary risk activities 3 of a computer service enterprise in coverage classes 14 for errors and omissions (E & O) risk exposure factors 4 in FIG. 3 and for broad tort risk exposure factors 4 in FIG. 4. In FIGS. 3 and 4, the risk activities 3 are shown as rows, while the risk exposure factors 4 are shown as columns. The risk activities 3 which might be performed by a computer service enterprise could include training services or the operation of a help or customer support desk, system installation and maintenance, system integration, web page development and maintenance, web page hosting, software applications development, computer network consulting, and the like. The list of risk activities 3 shown is intended to be exemplary rather than exhaustive. Other risk activities not shown might be involved in a computer service enterprise and in other types of enterprises, such as manufacturing, delivery services, retailing, repair and maintenance services, professional services, and the like. The types of risk activities for a given enterprise are generally a unique combination of activities, although some types of activities may overlap multiple types of enterprises.

FIG. 3 illustrates exemplary risk exposure factors 4 associated with the coverage class 14 of errors and omissions (E and O) for a computer services enterprise, including, but not limited to, product or service failure, business interruption, spreading a software "virus", costs of system restoration, loss of a customer's data, costs of defense or investigation, all related to activities of the enterprise. Similarly, FIG. 4 illustrates exemplary risk exposure factors 4 associated with the coverage class 14 of broad torts by the enterprise, including torts related to privacy data use or sale, trademark infringement, defamation, invasion of privacy, rights of publicity, and the like and additionally costs of defense of such torts, all related to activities of the enterprise. The coverage classes 14 illustrated in FIGS. 3 and 4 are exemplary. Other coverage classes 14 might include general liability, fire, burglary and vandalism, workman's compensation for employees, other intellectual property such as patents or copyrights, and the like. It should be noted that FIGS. 3 and 4 illustrate component matrices 16 and 18 of a larger matrix 2 which generally characterizes risk activities 3 and risk exposure factors 4 of computer service enterprises.

Returning to FIG. 1, once the risk activity list has been generated at 10 and the risk exposure factors 4 identified at 11 and grouped into coverage classes 14 ant 12, each risk activity 3 is evaluated with respect to each risk exposure factor 4 at 20. The computer determines a risk score 22 at the mutual intersection of the risk activity 3 and the risk exposure factor 4 on the risk assessment matrix 2. The risk score 22 is a composite numeric measure of the likelihood of occurrence of the particular risk factor 4 for the risk activity 3 being considered and the likely severity. The illustrated risk score 22 is a 0-to-5 scale, with zero indicating irrelevance of the risk factor 4 for the particular activity 3. A score of five indicates high frequency combined with high severity. A score of three might indicate either high frequency of occurrence or high severity. Because of the subjective nature of such scoring, such scoring would preferably be done by experienced underwriters with reliance on readily available underwriting information.

Each risk score 22 is recorded in the matrix or stored at step 24, which is repeated until the last exposure factor 4 is assessed at 26 for the current coverage class 14. When all the risk factors 4 for a coverage class 14 have been scored for the current risk activity 3, the risk scores 22 for the class 14 are summed at 28 to determine a class subtotal 30 for the risk activity 3 within the particular coverage class 14. The class subtotal 30 is recorded or stored in the matrix 2 at step 32 for each class in a repetitive fashion until the last exposure class 14 has been processed at 34. The class subtotals 30 are then summed at 36 to derive an activity sum or total risk rating 38 for the particular risk activity 3.

The risk activity sum or total risk rating 38 for each risk activity 3 identified for the industry is compared in step 40 to a previously determined risk threshold which is a cutoff point for considering coverage for a given activity 3. The risk threshold represents a level of risk exposure which cannot be economically tolerated and may be scaled to an overall risk severity and frequency rating for each activity, as shown in FIG. 4. For example and with reference to the matrices shown in FIGS. 3 and 4, the insurer may decide that it is not willing to insure or cover any risk activity having a total risk rating 38 which exceeds a threshold score of forty-five (45). Applying forty-five as the threshold score, the insurer would decline to cover or exclude from coverage in its insurance for the computer services industry any claims arising out of web page development and maintenance and software applications development. Although not shown in the drawings, these activities could then be deleted from the matrix 2, such that the matrix only showed those activities which were to be covered.

If the total risk rating 38 exceeds the pre-established threshold in the test 40, coverage is declined for the associated activity at 44. As processing for each risk activity 3 is completed, the process 1 is repeated for the next activity 3 at 48 until the last activity 3 in the enterprise is detected at 50. The risk assessment matrix 2, thus generated, is saved at 52 for further use and processing purposes.

Although it is generally considered preferable, for ease of application, to utilize a single risk threshold for determining which activities will be covered, it is foreseen that in some cases it may be appropriate to vary the risk threshold according to the particular activity 3. In addition, the risk threshold may be changed over time and the risk scores for various activities might be adjusted over time, as a more complete statistical history is developed for the activity 3. Changes in the risk threshold or the total risk ratings 38 could result in the exclusion of previously covered activities or providing coverage for previously excluded activity.

The risk assessment method 1 may be used to generate a number of risk assessment matrices 2 which can be tailored to a number of types or categories of enterprises. The matrices 2 include the most common risk activities 3 known to be involved in enterprises of a given type. In many cases, such as new categories of enterprises for which little actual history or actuarial statistics exists or which involve activities not previously assessed, risk assessment matrices 2 can be assembled from at least the known risk activities 3 which are involved in the enterprise even without significant amounts of actuarial statistics.

Figure 2:
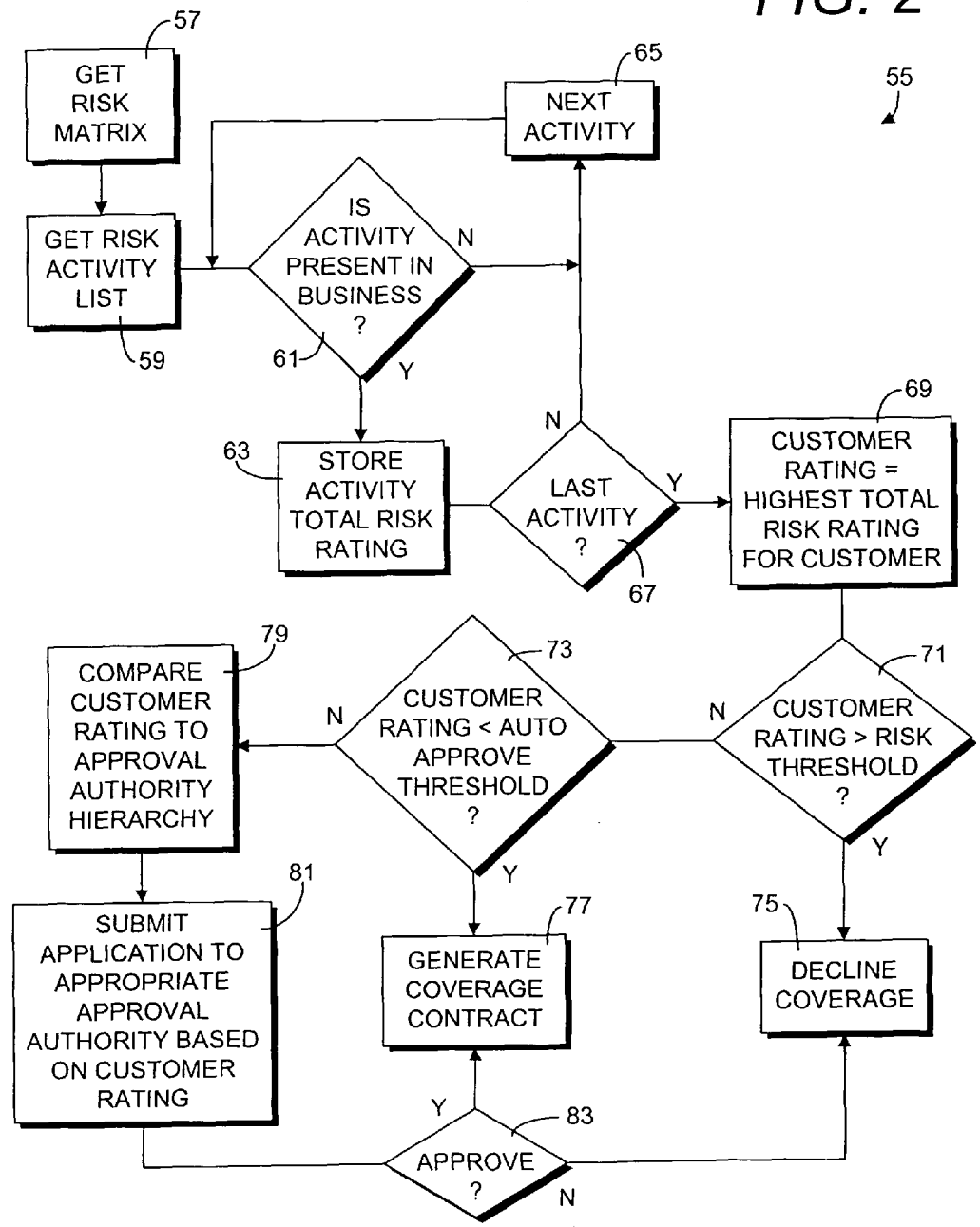
FIG. 2 is a flow diagram illustrating the principal steps in applying the risk assessment matrix of the present invention to underwriting risks of a customer.

The orderly manner and method 1, in which the matrices 2 are generated, results in a practical underwriting tool, which is particularly useful in the development of online or web-based applications for insurance coverage and, in some cases, to automatic approval or renewal of coverage. FIG. 2 illustrates a risk assessment application process 55 for applying the risk assessment method 1 and risk assessment matrices 2 to assessing risks associated with a new enterprise or a new insurance applicant. The matrices 2 may be utilized to develop a scaled hierarchy for determining the level of underwriting authority necessary to approve binding coverage. Such a system may then be used to automatically bind coverage or renew an existing insurance contract. The scoring system of the matrices 2 can also be utilized in the overall process of determining premium rate structures.

Referring to FIG. 2, the process 55 accesses one or more risk assessment matrices 2 at 57 and the risk activity list or lists therefrom at 59. The matrices 2 and activities 3 are those determined to be most appropriate for the enterprise under assessment. At step 61, the insured is repeatedly queried as to the activities 3 present or foreseen within the enterprise. For example, a particular applicant may provide services related for training, system installation and computer network consulting, but not web page development or hosting or software applications development. The potential insured may be given a warning that provision of false, misleading, or incomplete information may result in loss of coverage, denial of subsequent claims, or subject the insured to criminal prosecution for fraud in some cases. For each activity 3 present in the enterprise, the associated activity total risk rating 38, which was previously determined, is stored at 63. The process 5 loops for each additional activity 3 through 65 until a last activity is detected at 67. The stored risk ratings 38 are analyzed, and the highest risk rating 38 for the customer is selected and designated as the customer rating at 69. In further processing, the customer rating 69 is used as a measure of overall risk potential for the customer. Alternatively, the stored risk ratings 38 could be summed, or averaged and compared to appropriate risk thresholds. Similarly, the insurer could weight the risk ratings relative to the percentage of the customer's business related to a particular risk activity 3. For example, if twenty percent of the customer's business is related to web page development having a total risk rating 38 of fifty, and the remaining eighty percent is related to computer network consulting having a total risk rating 38 of twelve, then the weighted customer rating could be calculated as eighty percent of twelve plus twenty percent of fifty, for a weighted customer rating of 19.6.

The customer rating 69 is tested against an upper risk threshold at 71 and a lower automatic approval threshold at 73. If the customer rating 69 exceeds the upper risk threshold, coverage is declined at 75. If the customer rating 69 is less than the auto-approval threshold, a proposed coverage contract is generated at 77. The coverage contract may identify risks covered, coverage limits, exclusions, premium, deductibles, terms of payment, and the like. Under some circumstances, the potential insured may be able to accept the coverage contract electronically. Otherwise, the contract may be subject to further negotiation or clarification by way of an underwriter or agent.

If the customer rating 69 falls between the auto-approval threshold and the upper risk threshold, it is compared to a pre-established approval hierarchy at 79 and then, by that means, submitted to an appropriate approval authority at 81. Assuming everything appears in order, the appropriate underwriter can then enable generation of a coverage contract at 77 if approved at 83 or declined at 75 if not approved. Otherwise, further negotiations can occur.

The greater the potential risk of an activity 3, the greater the underwriting authority necessary to bind or approve coverage. The insurer establishes a range of scores for the applicant's customer rating 69 which are associated with the increasing levels of authority to approve coverage. As an example of such a range, an applicant might be entitled to automatic approval if the customer rating 69 were less than fifteen (15). An applicant having a customer rating 69 of between fifteen (15) and twenty-four (24) would require approval from a first level underwriter to bind coverage, between twenty-five (25) and thirty-five (35) would require approval from a second level underwriter to bind coverage, and anything over thirty-five (35) would require approval from a third level underwriter or be automatically denied. Premiums could be scaled in a similar fashion to the customer rating 69 for a particular applicant. The process 55 can also be used for contract renewal purposes for any new activities 3 which an enterprise wishes to add for coverage.

The information provided by the matrix 2 may be used for a wide variety of decision making processes relating to the offering of insurance in addition to those already described. The matrix 2 may be used to make determinations as to whether to exclude certain risk exposure factors 4 from coverage. For example, if a large number of risk scores 22 associated with a particular risk exposure factor were high, a decision may be made to specifically exclude from coverage such risk exposure factors 4. A formula could be developed for making such a determination. For example, an average of the risk scores 22 for a particular risk exposure factor 4 could be calculated and coverage could be excluded if the average exceeded a threshold value, such as 3.5 out of 5.

It is to be understood that while certain forms of the present invention have been illustrated and described herein, it is not to be limited to the specific forms or arrangement of parts described and shown.

What is claimed and desired to secure by Letters Patent is:

1. A web-based process for quantitatively assessing risks associated with a selected enterprise for the purpose of enabling or disabling offering of insurance coverage on the enterprise, the enterprise engaged in a computer services industry, the process utilizes a computer system with a processor for collecting and processing information, the process comprising the steps of:
   (a) assigning a plurality of pre-defined business-related component activities to the computer services industry, the plurality of component activities assigned to the computer services industry are pre-defined activities identified as typically performed by an enterprise included within the computer services industry and include a quantifiable risk;
   (b) assigning a plurality of known risk factors to each insurance coverage classification being offered to the enterprise included within the computer services industry, each risk factor is an actual risk exposure potentially occurring as part of the enterprise performing at least one of the assigned component activities, each insurance coverage classification includes risk factors having common characteristics;
   (c) generating a series of known risk factors based on the insurance coverage classification being analyzed, the series of risk factors is generated from the plurality of known risk factors assigned to each insurance coverage classification being offered;
   (d) developing at least one matrix including the component activities assigned to the computer services industry and the generated series of known risk factors for assessing the identified component activities with respect to the series of known risk factors;
   (e) determining within the at least one matrix an intersection of a risk factor and an associated risk activity, wherein the intersection provides a numeric activity score for each component activity assigned to the computer services industry and each assigned risk factor, the numeric activity score is based on a likelihood of a claim and an amount of a claim based on a risk associated with a particular risk factor occurring with respect to a given identified component activity of the enterprise;
   (f) using the processor to process activity scores stored for each risk factor and calculate a risk rating for each associated component activity;
   (g) upon said risk rating for a selected activity exceeding a selected decline score, automatically disabling, by the processor, the offering of insurance coverage on the associated component activity; and (h) upon said risk rating for a selected activity not exceeding said decline score, enabling the automatic offering, by the processor, of insurance coverage of said component activity.

2. A process as set forth in claim 1 and including the step of:
(a) proportioning ranges of said risk rating to a premium value range of premiums associated with insurance coverage on the associated component activity.

3. A process as set forth in claim 1 and including the step of:
(a) associating a hierarchy of approval requirements with ranges of said risk rating.

4. A process as set forth in claim 1 and including the steps of:
(a) dividing said risk factors into a plurality of coverage classes having risk characteristics in common;
(b) summing activity scores associated with one of said identified component activities in relation to each risk factor within a coverage class to obtain a class sum; and
(c) summing class sums associated with said coverage classes to obtain said risk rating.

5. A process as set forth in claim 1 and including the step of:
(a) organizing said identified component activities to be contained along an axis of the matrix and said risk factors to be contained along another axis of the matrix with each identified component activity intersecting each risk factor at an associated activity score.

6. A process as set forth in claim 1 and including the steps of:
(a) identifying a plurality of previously assessed component activities of a customer enterprise;
(b) retrieving a previously determined risk rating associated with each of said component activities identified;
(c) identifying a customer rating equal to a numerically highest risk rating of the risk ratings associated with the identified component activities;
(d) comparing said customer rating to a previously developed enterprise hierarchy of approval authority; and
(e) submitting an application for coverage of a customer enterprise comprising said identified component activities to an approval authority within said enterprise hierarchy commensurate with said customer rating.

7. A process as set forth in claim 1 and including the steps of:
(a) identifying a plurality of previously assessed component activities of a customer enterprise;
(b) retrieving a previously determined risk rating associated with each of said component activities identified;
(c) identifying a customer rating equal to a numerically highest risk rating of the risk ratings associated with the identified component activities;
(d) comparing said customer rating to a previously developed range of premium values proportioned to a range of customer ratings; and
(e) obtaining a premium value for coverage of the assessed component activities of said customer enterprise substantially proportional to said customer rating.

8. A process as set forth in claim 1 wherein assigning a plurality of pre-defined business-related component activities to the computer services industry further comprises assigning a plurality of pre-defined business-related component activities to the computer services industry that include at least computer training services or operation of a help or customer support desk, computer system installation and maintenance, computer system integration, web page development and maintenance, web page hosting, software application development, and computer network consulting.

9. A process as set forth in claim 1 and including the step of:
(a) computing the risk rating for a particular component activity by adding all of the numeric activity scores associated with the particular component activity.

10. A process as set forth in claim 9 and including the steps of:
(a) calculating risk ratings for all component activities in the matrix;
(b) analyzing all of the calculated risk ratings to determining the highest risk rating; and
(c) setting a customer risk rating based on the highest risk rating.

11. A process as set forth in claim 10 and including the steps of:
(a) comparing the customer risk rating against an upper risk threshold and a lower automatic approval threshold; and
(b) determining that coverage is declined when the customer risk rating exceeds the upper risk threshold or generating a proposed coverage contract when it is determined that the customer risk rating is less than the automatic approval threshold.

12. A web-based process for quantitatively assessing risks associated with a selected enterprise for the purpose of enabling or disabling offering of insurance coverage on the enterprise, the enterprise engaged in a computer services industry, the process utilizes a computer system with a processor for collecting and processing information, the process comprising the steps of:
(a) assigning a plurality of pre-defined business-related component activities to the computer services industry, the plurality of component activities assigned to the computer services industry are pre-defined activities identified as typically performed by an enterprise included within the computer services industry and include a quantifiable risk;
(b) assigning a plurality of known risk factors to each insurance coverage classification being offered to the enterprise included within the computer services industry, each risk factor is an actual risk exposure potentially occurring as part of the enterprise performing at least one of the assigned component activities, each insurance coverage classification includes risk factors having common characteristics;
(c) generating a series of known risk factors based on the insurance coverage classification being analyzed, the series of risk factors is generated from the plurality of known risk factors assigned to each insurance coverage classification being offered;
(d) developing at least one matrix including the component activities assigned to the computer services industry and the generated series of known risk factors for assessing the identified component activities with respect to the series of known risk factors;
(e) determining within the at least one matrix an intersection of a risk factor and an associated risk activity, wherein the intersection provides a numeric activity score for each component activity assigned to the computer services industry and each assigned risk factor, the numeric activity score is based on a likelihood of a claim and an amount of a claim based on a risk associated with a particular risk factor occurring with respect to a given identified component activity of the enterprise;
(f) using the processor to process activity scores stored for each risk factor and calculate a risk rating for each associated component activity;
(g) upon said risk rating for a selected activity exceeding a selected decline score, automatically disabling, by the processor, the offering of insurance coverage on the associated component activity;

(h) upon said risk rating for a selected activity not exceeding said decline score, enabling the automatic offering, by the processor, of insurance coverage of said component activity;

(i) proportioning ranges of said risk rating to a premium value range of premiums associated with insurance coverage on the associated component activity; and (j) associating a hierarchy of approval requirements with ranges of said risk rating.

13. A process as set forth in claim 12 and including the steps of:

(a) dividing said risk factors into a plurality of coverage classes having risk characteristics in common;

(b) summing activity scores associated with one of said identified component activities in relation to each risk factor within a coverage class to obtain a class sum; and (c) summing class sums associated with said coverage classes to obtain said risk rating.

14. A process as set forth in claim 12 and including the step of:

(a) organizing said identified component activities to be contained along an axis of the matrix and said risk factors to be contained along another axis of the matrix with each identified component activity intersecting each risk factor at an associated activity score.

15. A process as set forth in claim 12 and including the steps of:

(a) identifying a plurality of previously assessed component activities of a customer enterprise;

(b) retrieving a previously determined risk rating associated with each of said component activities identified;

(c) identifying a customer rating equal to a numerically highest risk rating of the risk ratings associated with the identified component activities;

(d) comparing said customer rating to a previously developed enterprise hierarchy of approval authority; and (e) submitting an application for coverage of a customer enterprise comprising said identified component activities to an approval authority within said enterprise hierarchy commensurate with said customer rating.

16. A process as set forth in claim 12 and including the steps of:

(a) identifying a plurality of previously assessed component activities of a customer enterprise;

(b) retrieving a previously determined risk rating associated with each of said component activities identified;

(c) identifying a customer rating equal to a numerically highest risk rating of the risk ratings associated with the identified component activities;

(d) comparing said customer rating to a previously developed range of premium values proportioned to a range of customer ratings; and (e) obtaining a premium value for coverage of the assessed component activities of said customer enterprise substantially proportional to said customer rating.

17. A web-based process for quantitatively assessing risks associated with a selected enterprise for the purpose of enabling or disabling offering of insurance coverage on the enterprise, the enterprise engaged in a computer services industry, the process utilizes a computer system with a processor for collecting and processing information, the process comprising the steps of:

(a) assigning a plurality of pre-defined business-related component activities to the computer services industry, the plurality of component activities assigned to the computer services industry are pre-defined activities identified as typically performed by an enterprise included within the computer services industry and include a quantifiable risk;

(b) assigning a plurality of known risk factors to each insurance coverage classification being offered to the enterprise included within the computer services industry, each risk factor is an actual risk exposure potentially occurring as part of the enterprise performing at least one of the assigned component activities, each insurance coverage classification includes risk factors having common characteristics;

(c) generating a series of known risk factors based on the insurance coverage classification being analyzed, the series of risk factors is generated from the plurality of known risk factors assigned to each insurance coverage classification being offered;

(d) developing at least one matrix including the component activities assigned to the computer services industry and the generated series of known risk factors for assessing the identified component activities with respect to the series of known risk factors;

(e) dividing said risk factors into a plurality of coverage classes having risk characteristics in common;

(f) determining within the at least one matrix an intersection of a risk factor and an associated risk activity, wherein the intersection provides a numeric activity score assigned to each component activity assigned to the computer services industry and each assigned risk factor, the numeric activity score is based on a likelihood of a claim and an amount of a claim based on a risk associated with a particular risk factor occurring with respect to a given identified component activity of the enterprise;

(g) using the processor to process activity scores associated with one of said identified component activities in relation to each risk factor within a coverage class to obtain a class sum;

(h) using the processor to process class sums associated with said coverage classes to obtain a risk rating;

(i) upon said risk rating for a selected component activity exceeding a selected decline score, automatically disabling, by the processor, the offering of insurance coverage on the associated component activity; and (j) upon said risk rating for a selected component activity not exceeding said decline score, enabling the automatic offering, by the processor, of insurance coverage of said component activity.

18. A process as set forth in claim 17 and including the step of:

(a) proportioning ranges of said risk rating to a premium value range of premiums associated with insurance coverage on the associated component activity.

19. A process as set forth in claim 17 and including the step of:

(a) associating a hierarchy of approval requirements with ranges of said risk rating.

20. A process as set forth in claim 17 and including the step of:

(a) organizing said identified component activities to be contained along an axis of the matrix and said risk factors to be contained along another axis of the matrix with each identified component activity intersecting each risk factor as an associated activity score.

21. A process as set forth in claim 17 and including the steps of:
  (a) identifying a plurality of previously assessed component activities of a customer enterprise;
  (b) retrieving a previously determined risk rating associated with each of said component activities identified;
  (c) identifying a customer rating equal to a numerically highest risk rating of the risk ratings associated with the identified component activities;
  (d) comparing said customer rating to a previously developed enterprise hierarchy of approval authority; and
  (e) submitting an application for coverage of a customer enterprise comprising said identified component activities to an approval authority within said enterprise hierarchy commensurate with said customer rating.

22. A process as set forth in claim 17 and including the steps of:
  (a) identifying a plurality of previously assessed component activities of a customer enterprise;
  (b) retrieving a previously determined risk rating associated with each of said component activities identified;
  (c) identifying a customer rating equal to a numerically highest risk rating of the risk ratings associated with the identified component activities;
  (d) comparing said customer rating to a previously developed range of premium values proportioned to a range of customer ratings; and
  (e) obtaining a premium value for coverage of the assessed component activities of said customer enterprise substantially proportional to said customer rating.

* * * * *